United States Patent [19]

Kuwayama et al.

[11] Patent Number: 4,942,782
[45] Date of Patent: Jul. 24, 1990

[54] REVERSE SHIFT CONTROL DEVICE ON AUTOMATIC TRANSMISSION

[75] Inventors: Yoshinari Kuwayama, Tokoname; Fumitomo Yokoyama, Anjo; Masakatsu Miura, Kariya, all of Japan

[73] Assignee: Aisin-Warner Kabushiki Kaisha, Aichi, Japan

[21] Appl. No.: 172,721
[22] PCT Filed: Jun. 30, 1987
[86] PCT No.: PCT/JP87/00454
  § 371 Date: Mar. 1, 1988
  § 102(e) Date: Mar. 1, 1988
[87] PCT Pub. No.: WO88/00304
  PCT Pub. Date: Jan. 14, 1988

[30] Foreign Application Priority Data

Jul. 1, 1986 [JP] Japan .................. 61-154695

[51] Int. Cl.$^5$ ............................................. B60K 41/10
[52] U.S. Cl. .................................. 74/866; 74/869
[58] Field of Search ............ 74/866, 867, 868, 869, 74/878, 476

[56] References Cited

U.S. PATENT DOCUMENTS

| | | | |
|---|---|---|---|
| 3,393,586 | 7/1968 | Zundel | 74/878 |
| 3,682,014 | 8/1972 | Magg et al. | 74/866 X |
| 3,937,105 | 2/1976 | Arai et al. | 74/866 X |
| 3,937,108 | 2/1976 | Will | 74/869 X |
| 3,974,893 | 8/1976 | Conner et al. | 74/866 X |
| 4,488,457 | 12/1984 | Nishimura et al. | 74/878 X |
| 4,574,661 | 3/1986 | Opperud et al. | 74/878 X |
| 4,829,853 | 5/1989 | Sakaguchi | 74/868 X |

FOREIGN PATENT DOCUMENTS

| | | | |
|---|---|---|---|
| 46-40041 | 1/1973 | Japan . | |
| 0487416 | 1/1973 | Japan . | |
| 50-43366 | 4/1975 | Japan . | |
| 51-64155 | 6/1976 | Japan . | |
| 57-29290 | 6/1982 | Japan . | |
| 0245861 | 12/1985 | Japan | 74/866 |
| 62-93545 | 4/1987 | Japan . | |
| 8700489 | 1/1987 | PCT Int'l Appl. | 74/866 |
| 8801029 | 2/1988 | PCT Int'l Appl. | 74/866 |

Primary Examiner—Leslie A. Braun
Assistant Examiner—Harold F. Macris
Attorney, Agent, or Firm—Wenderoth, Lind & Ponack

[57] ABSTRACT

A reverse shift control device of an automatic transmission prevents reverse running of the automatic transmission, even though a manual shift lever is set to a reverse range, when the vehicle runs at more than a predetermined speed. Certain shift valves have ports to which line pressure is applied from the manual valve when set to reverse, and also have ports which communicate with a hydraulic servo of a frictional engaging component which is engaged when the vehicle travels in reverse. When the manual valve is set to reverse and the vehicle speed is more than a predetermined speed (for example, 7 km/h), respective pairs of the ports are disconnected due to the shifting of the shift valves based on the signal issued by a controller.

5 Claims, 10 Drawing Sheets

| POSITION | | SOLENOID | | | | CLUTCH | | | | BRAKE | | | | O.W.C | | | |
|---|---|---|---|---|---|---|---|---|---|---|---|---|---|---|---|---|---|
| | | S1 | S2 | S3 | S4 | C₀ | C₁ | C₂ | C₃ | B₁ | B₂ | B₃ | B₄ | F₀ | F₁ | F₂ | F₃ |
| P | | × | ○ | × | | | | | | | | | ○ | | | | |
| R | STOP | × | ○ | × | | | ○ | | | | | ○ | ○ | | | | |
| | RUN | ○ | ○ | × | | | ○ | | | | | × | ○ | | | | |
| N | | × | ○ | × | | | | | | | | | ○ | | | | |
| D | idle | × | ○ | ○ | | | △ | | | ○ | | | ○ | | | | |
| D | 1ST | × | ○ | × | | | ○ | | | | | | ○ | | | ○ | ○ |
| | 2ND | ○ | ○ | × | ◎ | | ○ | | | ○ | | | ○ | | ○ | | ○ |
| | 3RD | ○ | × | × | ◎ | | ○ | ○ | | ○ | | | | | ○ | | |
| | 4TH | × | × | × | ◎ | ○ | ○ | ○ | | ○ | | | | | | | |
| | 5TH | × | × | ○ | ◎ | ○ | | ○ | | | ○ | ○ | | ○ | | | |
| 3 | 1ST | × | ○ | × | | | ○ | | | | | | ○ | | | ○ | ○ |
| | 2ND | ○ | ○ | × | ◎ | | ○ | | | ○ | | | ○ | | ○ | | ○ |
| | 3RD | × | × | × | ◎ | ○ | ○ | | | ○ | | | ○ | | | | ○ |
| | 4TH | × | × | ○ | ◎ | ○ | | | | ○ | ○ | | ○ | ○ | | | ○ |
| 2 | 1ST | × | ○ | × | | | ○ | | | | | ○ | ○ | | | ○ | ○ |
| | 2ND | × | × | × | | | ○ | | ○ | | ○ | | | | ○ | | |
| | (2ND) | ○ | ○ | × | | | ○ | | | ○ | ○ | | ○ | | ○ | | ○ |
| | (3RD) | ○ | × | × | | | ○ | | ○ | ○ | | | | | ○ | | |
| 1 | 1ST | × | ○ | × | | | ○ | | | | | ○ | ○ | | | ○ | ○ |
| | (2ND) | × | × | × | | | ○ | | ○ | | ○ | | | | ○ | | |
| | (3RD) | ○ | × | × | | | ○ | | ○ | ○ | ○ | | | | ○ | | |

| REMARKS | | |
|---|---|---|
| ○ | ON | S1,S2:DRAIN / S3:APPLY |
| × | OFF | S1,S2:APPLY / S3:DRAIN |
| ◎ | ON: L-UP ON / OFF: L-UP OFF | |
| △ | PRESSURE REDUCTION | |

| POSITION | | SOLENOID | | | | CLUTCH | | | | BRAKE | | | | O.W.C | | | |
|---|---|---|---|---|---|---|---|---|---|---|---|---|---|---|---|---|---|
| | | S1 | S2 | S3 | S4 | $C_0$ | $C_1$ | $C_2$ | $C_3$ | $B_1$ | $B_2$ | $B_3$ | $B_4$ | $F_0$ | $F_1$ | $F_2$ | $F_3$ |
| P | | × | ○ | × | | | | | | | | | ○ | | | | |
| R | STOP | ○ or × | × | × | | | ○ | | | | | ○ | ○ | | | | |
|   | RUN | ○ or × | ○ | × | | | ○ | | | | | ○ | × | | | | |
| N | | × | ○ | × | | | | | | | | | ○ | | | | |
| D | idle | × | ○ | ○ | | △ | | | | ○ | | | ○ | | | | |
| D | 1ST | × | ○ | × | | ○ | | | | | | | ○ | | ○ | ○ | |
|   | 2ND | ○ | ○ | × | ◎ | ○ | | | | | ○ | | ○ | | ○ | | ○ |
|   | 3RD | ○ | × | × | ◎ | ○ | ○ | ○ | | | ○ | | | | ○ | | |
|   | 4TH | × | × | × | ◎ | ○ | ○ | | | ○ | ○ | | | | | | |
|   | 5TH | × | × | ○ | ◎ | ○ | | | | ○ | ○ | ○ | | ○ | | | |
| 3 | 1ST | × | ○ | × | | ○ | | | | | | | ○ | | ○ | ○ | |
|   | 2ND | ○ | ○ | × | ◎ | ○ | | | | | ○ | | ○ | | ○ | | ○ |
|   | 3RD | × | × | × | ◎ | ○ | ○ | ○ | | | ○ | | ○ | | | | ○ |
|   | 4TH | × | × | ○ | ◎ | ○ | | | | ○ | ○ | | ○ | ○ | | | ○ |
| 2 | 1ST | × | ○ | × | | ○ | | | | | | ○ | ○ | | ○ | ○ | |
|   | 2ND | × | × | × | | ○ | | ○ | | | ○ | | | | ○ | | |
|   | (2ND) | ○ | ○ | × | | ○ | | | | | ○ | | ○ | | ○ | | ○ |
|   | (3RD) | ○ | × | × | | ○ | | ○ | ○ | | ○ | | | | ○ | | |
| 1 | 1ST | × | ○ | × | | ○ | | | | | | ○ | ○ | | ○ | ○ | |
|   | (2ND) | × | × | × | | ○ | | ○ | | | ○ | | | | ○ | | |
|   | (3RD) | ○ | × | × | | ○ | | ○ | ○ | ○ | | | | ○ | | | |

| REMARKS | | |
|---|---|---|
| ○ | ON | S1,S2:DRAIN/S3:APPLY |
| × | OFF | S1,S2:APPLY/S3:DRAIN |
| ◎ | ON:L-UP ON / OFF:L-UP OFF | |
| △ | PRESSURE REDUCTION | |

| POSITION | | SOLENOID | | | | CLUTCH | | | BRAKE | | | | O.W.C | | |
|---|---|---|---|---|---|---|---|---|---|---|---|---|---|---|---|
| | | S1 | S2 | S3 | S4 | C₁ | C₂ | C₃ | B₁ | B₂ | B₃ | B₄ | F₁ | F₂ | F₃ |
| P | | × | ○ | × | | | | | | | | ○ | | | |
| R | STOP | × | ○ | × | | ○ | | | | ○ | ○ | | | | |
| | RUN | ○ | ○ | × | | ○ | | | | × | ○ | | | | |
| N | | × | ○ | × | | | | | | | | ○ | | | |
| D | idle | × | ○ | ○ | | △ | | | ○ | | | ○ | | | |
| D | 1ST | × | ○ | × | | ○ | | | | | | ○ | | ○ | ○ |
| | 2ND | ○ | ○ | × | ◉ | ○ | | | | ○ | | ○ | ○ | | ○ |
| | 3RD | ○ | × | × | ◉ | ○ | | ○ | | ○ | | | ○ | | |
| | 4TH | × | × | × | ◉ | ○ | | ○ | | ○ | | | | | |
| 3 | 1ST | × | ○ | × | | ○ | | | | | | ○ | | ○ | ○ |
| | 2ND | ○ | ○ | × | ◉ | ○ | | | | ○ | | ○ | ○ | | ○ |
| | 3RD | × | × | × | ◉ | ○ | | | | ○ | | | | | ○ |
| 2 | 1ST | × | ○ | × | | ○ | | | | | ○ | ○ | | ○ | ○ |
| | 2ND | × | × | × | | ○ | ○ | | | ○ | | | ○ | | |
| | (2ND) | ○ | ○ | × | | ○ | | | ○ | ○ | | ○ | ○ | | ○ |
| | (3RD) | ○ | × | × | | ○ | | ○ | ○ | ○ | | | ○ | | |
| 1 | 1ST | × | ○ | × | | ○ | | | | | ○ | ○ | | ○ | ○ |
| | (2ND) | × | × | × | | ○ | ○ | | | ○ | | | ○ | | |
| | (3RD) | ○ | × | × | | ○ | | ○ | ○ | ○ | | | ○ | | |
| REMARKS | | ○ | ON | | | S1,S2:DRAIN/S3:APPLY | | | | | | | | | |
| | | × | OFF | | | S1,S2:APPLY/S3:DRAIN | | | | | | | | | |
| | | ◉ | ON:L-UP ON OFF:L-UP OFF | | | | | | | | | | | | |
| | | △ | | | | PRESSURE REDUCTION | | | | | | | | | |

REVERSE SHIFT CONTROL DEVICE ON AUTOMATIC TRANSMISSION

BACKGROUND OF THE INVENTION

1. Field of the Invention

The present invention relates to a reverse shift control device for preventing an automatic transmission from shifting to reverse even if a shift lever is mistakenly manipulated to R range.

2. Description of the Prior Art

In an automatic transmission in general, if a shift lever is manipulated to R range, a sudden engine brake is applied even if an automobile is traveling forward.

Under such circumstances in automatic transmissions, a solenoid valve for anti-reverse and a switching valve, or a solenoid valve for a reverse clutch to prevent an automatic transmission from assuming a reverse condition even if a shift lever has been moved to R range, have been proposed.

However, the above-mentioned automatic transmissions must include exclusive solenoid valves, or other expensive valves; accordingly, the cost of such automatic transmissions is relatively high. Further, the recent demand for front-mounted front wheel drive engines and multiple speed transmissions require severe space restrictions for installation than ever.

SUMMARY OF THE INVENTION

Figure 1:
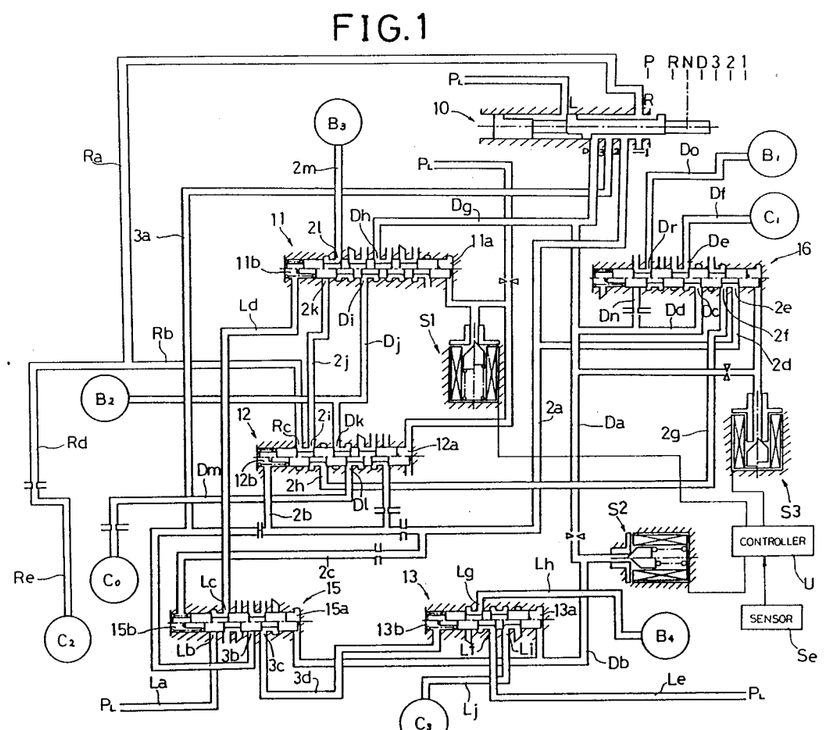
FIG. 1 is a sectional view of a main portion of a hydraulic control device including a reverse shift control device according to the present invention.

Thus an object of the present invention is to utilize shift valves and a solenoid valve to prevent an automatic transmission from assuming a reverse condition while the vehicle is running at a high speed, and more particularly to provide a reverse shift control device in an automatic transmission for performing the above function. above, and shown in FIG. 1 as an example.

In a hydraulic control device of an automatic transmission having hydraulic servos (C), (B) of certain frictional engaging components of a transmission gear mechanism, shift valves (11), (12), (13), (16), (15) to control oil pressure applied to each hydraulic servo, solenoid valves (S1), (S2), (S3) to control the shift valves, a manual valve (10), respective ones of the shift valves (11), (12) have ports (Rc), (2k) to which line pressure is applied in a reverse range of the manual valve (10), and have ports (2i), (2l) which connect a hydraulic servo (B3) of a frictional engaging component (1st & reverse brake, for example) operated when the vehicle assumes the reverse condition. When the manual valve is at R range and the speed of the vehicle is greater than a predetermined speed (7 km/h for example), a controller (U) sends signals to the solenoid valve (S1) which controls the shift valves (11) and (12). Based on signals from controller (U), the shift valves (11), (12) are shifted so that the ports (Rc, 2j) and (2k, 2l) are disconnected.

In the above-described structure, when the manual valve (10) is at R range, line pressure is applied from a port (R) to a second clutch servo (C₂) through oil paths (Ra), (Rd) and (Re). Line pressure in oil path (Ra) is applied to a port (Rc) of the shift valve (12).

When the vehicle stops or runs at less than a predetermined speed, the first solenoid valve (S1) is switched "OFF", and the first and second shift valves (11), (12) assume the "upper half position". Consequently, line pressure in the port (Rc) is applied to a brake servo (B₃) (a frictional engaging component operated when in reverse) through the port (2i), the coil path (2j), and the ports (2k), (2l) of the first shift valve (11), and an oil path (2m). Then, the automatic transmission assumes the reverse condition, which causes the vehicle to traveling reverse.

On the other hand, when the vehicle is traveling forward at more than a predetermined speed, the controller (U) sends signals to switch the first solenoid valve (S1) "ON". Then, the solenoid valve (S1) assumes a "drain condition", and the shift valves (11) and (12) are shifted to the "lower half position". Due to this operation of the shift valves, the ports (Rc and 2j) and (2k and 2l) are disconnected, and the brake servo (B₃) is drained because the port (2l) and a drain port are connected. Consequently, the automatic transmission is prevented from assuming the reverse condition.

As explained above, according to the present invention, when the manual valve (10) is shifted to R range, if the vehicle runs at more than a predetermined speed, each frictional engaging component (B₃, C₂, B₄) which is engaged or operated when in reverse are disengaged and released to prevent the vehicle from assuming the reverse condition; on the other hand, this operation is controlled by the shift valves (11), (12), and solenoid valve (S1) which controls the shift valves (11), (12), so that no special valves are required and a simple structure is provided.

It is to be noted that all numbers and symbols in parentheses used in the "SUMMARY OF THE INVENTION" are for reference purposes and do not limit the claims.

BRIEF DESCRIPTION OF DRAWINGS

In the accompanying drawings.

DETAILED DESCRIPTION OF THE PREFERRED EMBODIMENTS

The following is a description of preferred embodiments of the present invention.

Figure 2:
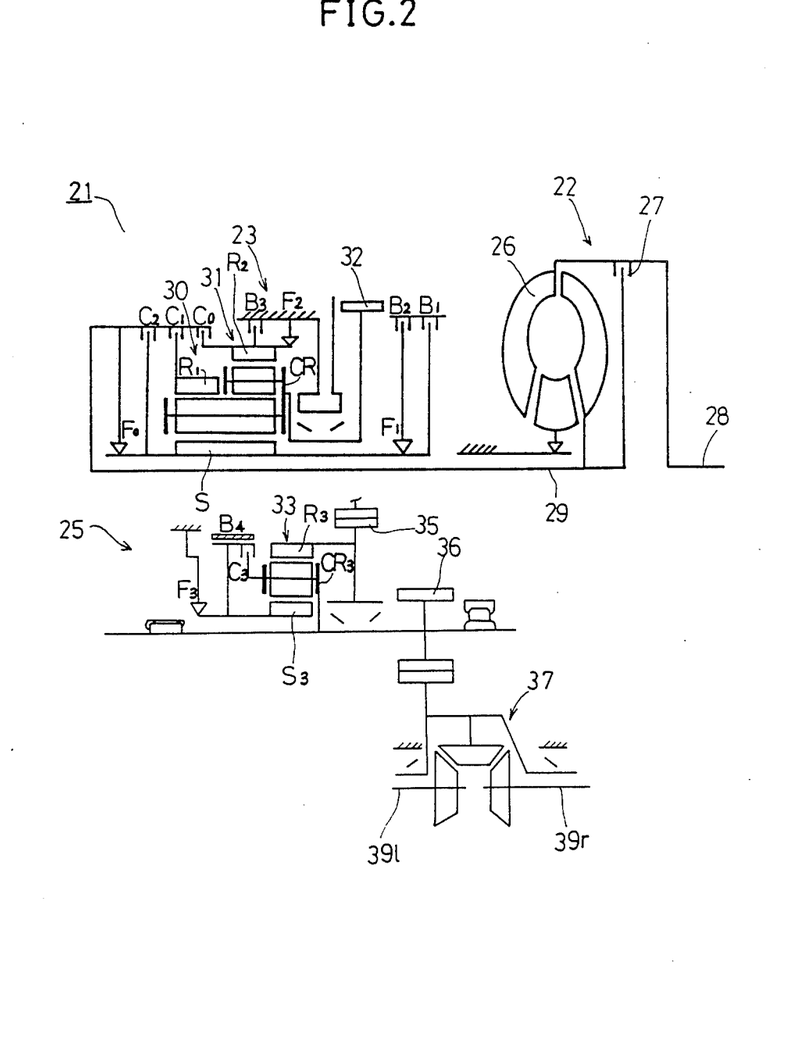
FIG. 2 is a schematic diagram of an automatic transmission to which the present invention is applicable.

A five speed automatic transmission 21 comprises a torque converter portion 22, a four speed automatic transmission mechanism portion 23 and an underdrive mechanism portion 25, as shown in FIG. 2.

The torque converter portion 22 has a torque converter 26 and a lock-up clutch 27. The engine crankshaft 28 is connected with an input shaft 29 through oil by the torque converter 26 or through a mechanical coupling by the lock-up clutch 27.

The four speed automatic transmission mechanism portion 23 includes a single planetary gear unit 30 and a dual planetary gear unit 31. Each gear unit has a carrier CR and a sun gear S. The carriers CR are connected to one another to form an integrated body; and the sun gears are connected to one another to form an integrated body, too. Still further, the input shaft 29 is coupled with the ring gear $R_1$ of the single planetary gear unit 30 through the first (forward) clutch $C_1$ and is also coupled with the sun gear S through the second (direct) clutlch $C_2$. The sun gear S is braked directly by the first (2nd coast) brake $B_1$ and the rotation thereof in one direction is regulated by the second (2nd) brake $B_2$ through a first one-way clutch $F_1$. The ring gear $R_2$ of the dual planetary gear unit 31 is braked directly by the third (1st & Rev) brake $B_3$ and the rotation of the ring gear $R_2$ in one direction is regulated by a second one-way clutch $F_2$. Furthermore, the input shaft 29 is connected with said ring gear $R_2$ of the dual planetary gear 31 through a third (overdrive) clutch $C_0$ and a third one-way clutch $F_0$ is operatively connected between the input shaft 29 and the sun gear S in order to limit the rotation of the sun gear S to that of the input shaft 29. Further, the carrier CR is connected with the counterdrive gear 32 which is the output member of the four speed automatic transmission mechanism portion 23.

On the other hand, the underdrive mechanism portion 25 comprises a single planetary gear unit 33 including a ring gear $R_3$ which is connected with a counterdriven gear 35 which is always engaged with the counterdrive gear 32; and a carrier $CR_3$ is connected with the output pinion 36. Further, the rotation of the sun gear $S_3$ in one direction is regulated by the fourth one-way clutch $F_3$; and the sun gear $S_3$ is braked by the fourth (underdrive) brake $B_4$ and is coupled with the carrier $CR_3$ through the fourth (underdrive direct) clutch $C_3$.

As for the output pinion 36, it is connected with the right and left axles $39r$, $39l$ through the differential device 37.

Figure 3:
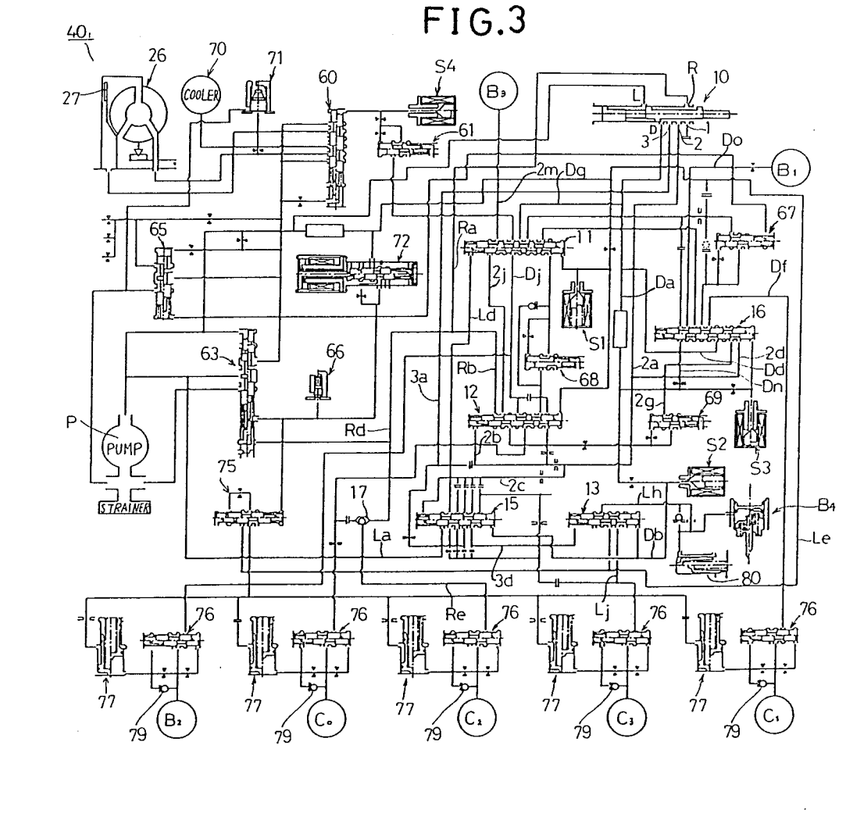
FIG. 3 shows a a hydraulic control circuit incorporating the present invention.

The five speed automatic transmission 21 is controlled and operated by a hydraulic circuit 40 shown in FIG. 3.

In this circuit 40, $C_0$, Chd 1, $C_2$ and $C_3$ are the hydraulic servos for the clutches, and $B_1$, $B_2$, $B_3$ and $B_4$ are the hydraulic servos for the brakes. Reference numeral (10) designates the manual valve, the (1-2) shift valve comprised the first shift valve 11, the (2-3) shift valve comprises the third shift valve 13, the (3-4) shift valve comprises the second shift valve 12, the (4-5) shift valve comprises the shift valve 16 and reference numeral (15) designates the down shift control valve. Reference (S1) designates a first solenoid valve to control the first and second shift valves (11, 12). Reference (S2) designates a second solenoid valve to control the third shift valve (13) and the down shift control valve (15). Reference (S3) is a third solenoid valve to control the shift valve (16). Reference numeral (60) designates a lock-up control valve, (S4) the fourth solenoid valve to duty control the lock up control valve (60), and (61) a lock-up modulator valve to stabilize duty control by the fourth solenoid valve (S4). Reference numeral (63) designates a primary regulator valve, (65) a secondary reguator valve, (66) a pressure release valve, (67) a C1 modulator valve, (68) a second modulator valve and (69) a low modulator valve. Reference numeral (70) designates a cooler, (71) a cooler bypass valve and (72) a throttle valve comprising a linear solenoid valve to regulate the line pressure to a desirable level. Reference numeral (75) designates an accumulator control valve, (26) the torque converter, (27) the lock-up clutch, and reference (P) a hydraulic pump. The hydraulic servo of the first clutch ($C_1$), that of the second clutch ($C_2$), that of the third clutch ($C_0$), that of the fourth clutch ($C_3$), and the second hydraulic servo of the second brake ($B_2$) are connected to a regulator valve (76), an accumulator (77) and a check valve (79). An accumulator (80) which is a setting type of accumulator is connected to the fourth brake hyuraulic servo ($B_4$).

In FIG. 3, a symbol similar to that used to represent a capacitor, represents a separator plate blocking oil paths when the hydraulic device is utilized in a four speed automatic transmission.

Figure 4:
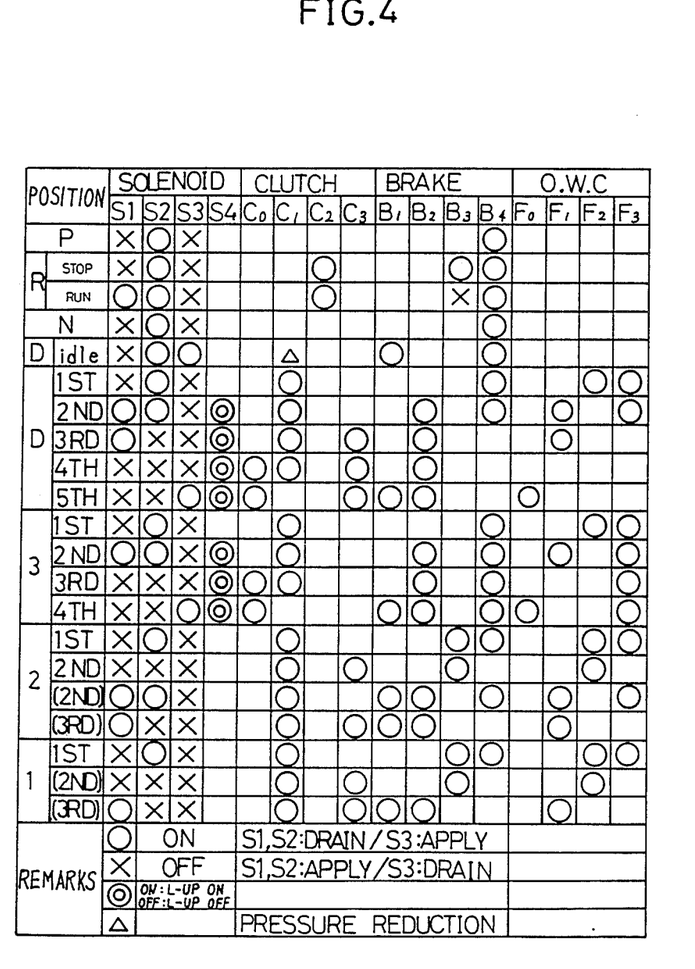
FIG. 4 is a table of operation.

Now, the operation of the present invention will be described in detail. A five speed automatic transmission 21 provides the first to the fifth speed of each range set by the manual valve 10. At each range set by the manual valve 10, the first to the fourth solenoid valves (S1, S2, S3 and S4) in the hydraulic control circuit 40 operate in accordance with FIG. 4 and the clutches $C_0$–$C_3$, the brakes $B_1$–$B_4$, and the one way clutches $F_0$–$F_3$ are controlled by the solenoid valves.

At the first speed in D range, the first solenoid valve S1 is "OFF" (supply-condition), the second solenoid valve S2 is "ON" (drain-condition) and the third solenoid valve S3 is "OFF" (drain-condition). As shown in FIG. 1 the shift valve 11 (1-2 stage shifting) and the shift valve 12 (3-4 stage shifting) assume the "upper half position", and the shift valve 13 (2-3 stage shifting), the shift valve 16 (4-5 stage shifting) and down shift control vvalve 15 assume the "lower half position". In this condition, line pressure from the port D of the manual valve is applied to the first clutch hydraulic servo $C_1$ through oil paths Da, Dd, the ports Dc, De of the shift valve 16 and the oil path Df. Line pressure $P_L$ through oil path Le is applied to the fourth brake hydraulic servo $B_4$ through the ports Lf, Lg of the shift valve 13 and oil path Lh. Under this state in the circuit, in the automatic transmission 21 the first forward clutch C1 is engaged and the fourth brake $B_4$ operates. Then, the rotation of the input shaft 29 is transmitted to the ring gear $R_1$ of the single unit 30 through the clutch C1. At this time, since rotation of the ring gear $R_2$ of the dual unit 31 is restrained by the second one way clutch $F_2$, the sun gear S rotates in a reverse direction without load, and the common carrier CR is rotated in a normal direction and at a much retarded speed. The rotation is transmitted from the counterdrive gear 32 to the counterdrive gear 35 of the underdrive mechanism (U/D) 25. The underdrive mechanism 25 is in an "underdrive condition" due to the operating states of the fourth brake $B_4$ and the fourth one-way clutch $F_3$. Consequently, the automatic transmission 21 as a whole outputs the first (1st) speed due to the combination of the first speed of the four speed automatic transmission 23 and the underdrive condition of the underdrive mechanism 25.

At the second speed in D range, the first solenoid valve S1 is "ON" (drain condition). The shift valve 11 (1-2 stage shifting) and the shift valve 12 (3-4 stage shifting) assume the "lower half position", line pressure from the port D of manual valve is applied to the second brake hydraulic servo $B_2$ through the oil path Dg, the ports Dh, Di of the shift valve 11 and the oil path Dj. Under this condition, the second brake $B_2$ is operated in addition to the engagement of the first forward clutch $C_1$. Then, the rotation of the sun gear S is restrained by the first one-way clutch $F_1$ by the second brake $B_2$. Accordingly the ring gear $R_1$, via the input shaft 29, rotates planet gear of the single unit 30 in a normal direction without load and rotates the common carrier CR in a normal direction at a reduced speed; this rotation is transmitted from the counterdrive gear 32 to the counterdriven gear 35 of the underdrive mechanism 25. The underdrive mechanism 25 is in the "underdrive condition". Consequently, the automatic transmission 21 as a whole outputs the second speed due to the combination of the second speed of the four speed automatic transmission 23 and the underdrive condition of the underdrive mechanism 25.

At the third speed in D range, the second solenoid valve S2 is switched "OFF" (supply-condition). The shift valve 13 (2-3 speed shifting) and the down shift control valve 15 assume the "upper half position". In this state, line pressure from oil path La is applied to the right control oil chamber 11b of the shift valve 11 through the ports Lb, Lc of the down shift control valve 15 and the oil path Ld; and line pressure in the oil path Le is applied to the fourth clutch hydraulic servo $C_3$ through ports Lf, Li of the shift valve 13 and the oil path Lj. In addition, the fourth broken hydraulic servo $B_4$ is drained through the port Lg. Due to the above, the four speed automatic transmission 23 continues to output the second speed, the fourth brake $B_4$ is released and the fourth clutch $C_3$ is enjoyed, and the underdrive mechanism assumes the direct coupling state. Consequently, the automatic transmission 21 as a whole outputs, the third speed due to the combination of the second speed of the four speed automatic transmission 23 and the direct coupling of the under-drive mechanism 25.

At the fourth speed in D range, the first solenoid valve $S_1$ is also "OFF" (supply-condition). Line pressure is applied to the right control oil chamber 12a of the shift valve 12. Then, the shift valve 12 is switched to the "upper half position". Although oil is applied to the right control oil chamber 11a of the shift valve 11, the valve 11 is kept at the "lower half position" because its chamber 11b is still under pressure and because of the reaction force exerted by the spring. In this condition, line pressure from the port D of the manual valve is applied to the port Dk of the (3-4) shift valve 12 through the oil path Dg ports Dh, Di of shift valve 11, and the oil path Dj. Further, the line pressure is applied to the fourth clutch hydraulic servo $C_0$ through the ports Dk, Dl and the oil path Dm. Under this state, the first forward clutch $C_1$, the fourth clutch $C_3$ and the third clutch $C_0$ are engaged in addition to the second brake $B_2$ being operated. Then, the rotation of the input shaft 29 is transmitted to the ring gear $R_1$ of the single unit 30 through the clutch C1. At this time, the rotation of input shaft 29 is transmitted to the ring gear $R_2$ of the dual unit 31 through clutch $C_0$; then, components of planetary gear units 30 and 31 rotate together, and via the carrier CR, the rotation of the input shaft 29 is transmitted to the counterdrive gear 32 so that the gear rotates at the same speed as the input shaft 29. The rotation of the counterdrive gear 32 is combined with the direct coupling condition of the underdrive mechanism 25, then the fourth speed which is the same speed as the speed of rotation of the input shaft 29 is output by the automatic transmission 21 as a whole.

At the fifth stage in D range, the third solenoid valve S3 is "ON" (supply-condition). Th shift valve 16 (4-5 stage shifting) assumes the "upper half position". The first clutch hydraulic servo $C_1$ is drained through the port De and a drain port. Line pressure is applied to the first brake hydraulic servo $B_1$ through oil path Da, the ports Dn, Dr and the oil path Do. Due to the above, the first forward clutch $C_1$ is disengaged and the first brake is operated. Then, the rotation of the input shaft 29 is transmitted to ring gear $R_2$ of the dual unit 31 through the clutch $C_0$. At this time, since rotation of the sun gear S is restrained, the rotation of the input shaft 29 rotates the ring gear R1 of the single unit rapidly without load; then, the carrier CR rotates rapidly, and such a high speed rotation is transmitted to the counterdrive gear 32 as an "overdrive". The rotation is transmitted by counterdrive gear 32 to counterdriven gear 35 of underdrive mechanism (U/D) 25. Consequently, the automatic transmission 21 as a whole outputs the fifth speed due to the combination of the overdrive condition and the direct coupling of the underdrive mechanism 25.

At the idle state in D range, line pressure to the first clutch hydraulic servo $C_1$ is reduced by the $C_1$ modulator valve 67 to the level just below that necessary to engage the clutch and operate the first brake $B_1$. The load is released from the input shaft 29, and thus, creeping is prevented and the first clutch $C_1$ is quickly engaged when the shift condition is changed to obtain the first speed. Since the first brake $B_1$ is in operation, regression of the vehicle if on a slope is prevented.

When the manual valve 10 is shifted from N range to R range, line pressure $P_L$ from the port L of the manual valve 10 is applied to the second clutch servo $C_2$ through the port R, oil paths Ra, Rd and Re. At this time, if a vehicle stop or runs at less than a predetermined speed, the first solenoid valve is "OFF" (supply-condition). The first shift valve 11 and the second shift valve 12 assume the "upper half position", line pressure in oil path Ra is applied to the port Rc of shift valve 12 through oil path Rb, and to port 2k of shift valve 11. Thus, line pressure is also applied to the third brake hydraulic servo $B_3$ through port 2l and the oil path 2m. Then, in the automatic transmission 21, the second clutch $C_2$ is engaged and third brake $B_3$ is operated. The rotation of the input shaft 29 is transmitted to the sun gear S through the clutch $C_2$. Under this condition, since the third brake $B_3$ restrains rotation of the ring gear $R_2$ of the dual unit 31, the ring gear $R_1$ of the single unit 30 rotates in a reverse direction, and thus, the carrier CR also rotates in a reverse direction. This reverse rotation is transmitted through the counterdrive gear 32 to the underdrive mechanism 25 which is in the "underdrive condition".

Also, when the manual valve 10 is shifted from N range to R range, if a vehicle runs at more than a predetermined speed (7 km/h), the controller U sends an "ON" signal to the first solenoid valve S1. In accordance with the signals from the speed sensor Se, the first solenoid valve S1 is shifted to assume the "drain condition", and the shift valves 11 and 12 are shifted to the "lower half position". Then, the port Rc and 2i of shift valve 12 are disconnected, port 2k and 2l of the shift valve 11 are also disconnected, and the port 2l and a drain port are connected so that the third brake $B_3$ is released by being drained. Due to the above operation, the third brake $B_3$ is released, and a shifting to R range is prevented.

When the manual valve 10 is shifted to 3 range by manipulating a shift lever or switch, line pressure is applied to the port 3 as well as to port D.

At 3 range, 1st and 2nd speeds are the same as in D range but 3rd and 4th speeds have different gear ratios. That is to say, at 3rd speed in 3 range, the solenoids S1, S2 and S3 are all "OFF". The solenoid valve S1 is in the "supply-condition", oil is applied to the right control oil chambers $11a$ and $12a$ of the (1-2) shift valve 11 and to the (3-4) shift valve 12, and thus, the shift valve 12 is shifted to the "upper half position". However, the (1-2) shift valve 11 is kept at the "lower half position" because the left control oil chamber $11b$ is under pressure due to the down shift control valve 15 being at the "upper half position" as in 3rd, 4th and 5th speeds in D range. Consequently, line pressure from the port D is applied to the second brake hydraulic servo $B_2$ through the oil path Dg, the ports Dh, Di of the (1-2) shift valve 11 and oil path Dj. Furthermore, line pressure in the oil path Dj is applied to the third clutch hydraulic servo $C_0$ through the ports Dk, $D_L$ of the (3-4) shift valve 12 and the oil path Dm. On the other hand, the second solenoid valve S2 assumes the "supply-condition" so that line pressure is applied to the right control oil chambers $15a$ and $13a$ of the down shift control valve 15 and the (2-3) shift valve 13 whereby the down shift control valve is shifted to the "upper half position". But the (2-3) shift valve 13 is kept at the "lower half position" because of line pressure from the port 3 of the manual valve 10 being applied to the left control oil chamber $13b$ through the oil path $3a$, the ports $3b$ and $3c$ of the down shift control valve 15 and the oil path $3d$, and because of the force exerted by the spring in the control oil chamber $13b$. Oil pressure in the oil path Le is applied to the fourth brake hydraulic servo $B_4$ through the ports Lf, Lg and the oil path Lh as in 1st and 2nd speed. In the automatic transmission 21, the first clutch $C_1$ and the third clutch $C_0$ are engaged, and the second $B_2$ and the fourth brake $B_4$ are operated. The four speed automatic transmission mechanism 23 assumes the direct coupling condition and the underdrive mechanism 25 assumes the underdrive condition. Then the 3rd speed of 3 range is output. This condition, in general, provides a larger gear ratio than in 3rd stage in D range, engine brake is more effective and a higher acceleration is provided.

At the 4th stage in 3 range, the third solenoid valve S3 is switched "ON". Then, the (4-5) shift valve 16 is shifted to the "upper half position", and line pressure from the port D is applied to the first brake hydraulic servo B1 through the ports Dn, Dr and the oil path Do, and the first clutch hydraulic servo $C_1$ is drained through the (4-5) shift valve 16 whereby the first clutch $C_1$ is disengaged. Consequently, in the automatic transmission 21, the third clutch $C_0$ is engaged, and the first, second and fourth brakes (B1, B2 and B4) are operated. Then, the four speed automatic transmission mechanism 23 assumes the overdrive condition and the underdrive mechanism 25 assumes the underdrive condition. As a whole, the fourth speed of 3 range is output. This condition, in general, provides a larger gear ratio than that provided in the fourth speed in D range.

When the manual valve 10 is shifted to 2 range, line pressure port L is connected to the port 2 and to ports D and 3.

At the first speed in 2 range, the solenoid valves S1, S2 and S3 are in the same state as in first speed in D and 3 range, line pressure from port 2 of the manual valve 10 is applied to the port $2e$ of the (4-5) shift valve 16 through the oil paths $2a$ and $2d$, and, since the shift valve 16 is kept at the "lower half position", line pressure is also applied to the port $2h$ in the (3-4) shift valve 12 through the port $2f$ of the shift valve 16 and the oil path $2g$. On the other hand, since line pressure from the port 2 is applied to the left control oil chamber $12b$ of the (3-4) shift valve 12 through the oil paths $2a$, $2b$, the valve 12 is kept at the "lower half position" despite line pressure being applied to the right control oil chamber $12a$ due to the solenoid valve S1 being "OFF". Accordingly, since the shift valve 12 is kept at the "lower half position", line pressure at the port $2h$ is applied to the third brake hydraulic servo $B_3$ through the port $2i$, the oil path $2j$, the ports $2k$ and $2l$ of the (1-2) shift valve 11 which is at the "upper half position" and the oil path $2m$. At this time, line pressure applied to the third brake hydraulic servo $B_3$ is suitably adjusted by the low modulator valve 69 located in the oil path $2g$ as shown in FIG. 3. Accordingly, at the 1st stage in 2 range, the third brake B3 is operated in addition to the operating conditions existing when in 1st speed of D range. Due to the operation mentioned above, the gear ratio is the same as in 1st speed in D range; however, when engine brake (reversal of input and output) is applied, this 1st speed in 2 range is maintained because of the ring gear R2 being restrained by the brake B3, as opposed to when in D range at the first speed, and transmission is disconnected by the one-way clutch F2.

At 2nd speed in 2 range, the solenoid valve S2 is "OFF". Line pressure is applied to the right control oil chamber $15a$ of the down shift control valve 15, and the right control oil chamber $13a$ of the (2-3) shift valve 13, and the shift valve 13 is shifted to the "upper half position". On the other hand, since line pressure from the oil path $2a$ is applied to the left control oil chamber $15b$ of the down shift control valve 15 through the oil path $2c$, the down shift control valve 15 is kept at the "lower half position" with the addition of the force exerted by the spring. Under this condition, line pressure is applied to the fourth clutch hydraulic servo $C_3$ through the ports Lf, Li and the oil path Lj. Accordingly, the first and the fourth clutches ($C_1$ and $C_3$) are engaged and the third brake operates. Then, the four speed automatic transmission mechanism 23 assumes the 1st speed condition and the underdrive mechanism 25 assumes the direct coupling condition. As a whole, the 2nd speed in 2 range is obtained. In this condition, in general, the gear ratio is larger than that in the second speed of D range and 3 range. At this time, as in 1st speed, the third brake operates and engine brake keeps the 2nd speed. At 2 range, it is possible to obtain 2nd and 3rd speeds as in D range as shown in the parentheses.

Furthermore, in 1 range, 1st speed is obtained in the same manner as in 2 range. As shown in the parentheses 2nd speed is obtained in the same manner as in 2 range and 3rd speed as in D range. In the hydraulic circuit $40_1$, if the solenoid valves (S1, S2 and S3) fail, shifting to a speed in each range for emergency purposes is automatically carried out such as to the 4th speed in D range, 3rd speed in 3 range, and the 2nd speed in 2 and 1 ranges, by manipulating the manual valve 10, it is possible to obtain a suitable driving condition.

Figure 5:
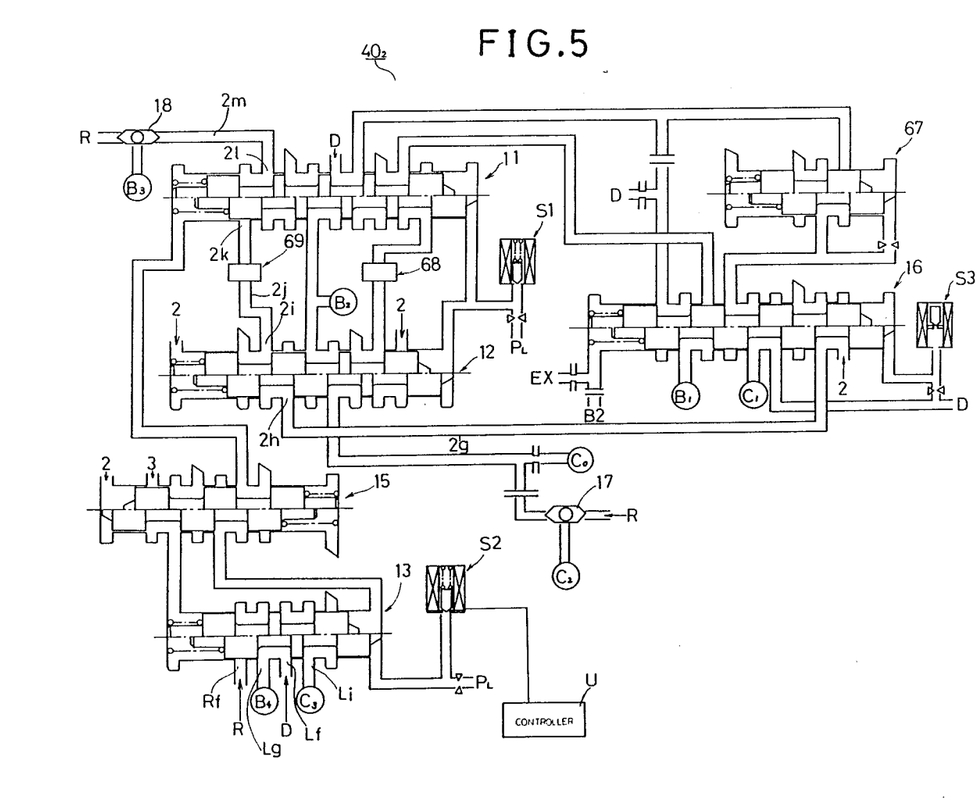
FIG. 5 is a sectional view of a hydraulic control device including a modified embodiment according to the present invention.
Figure 6:
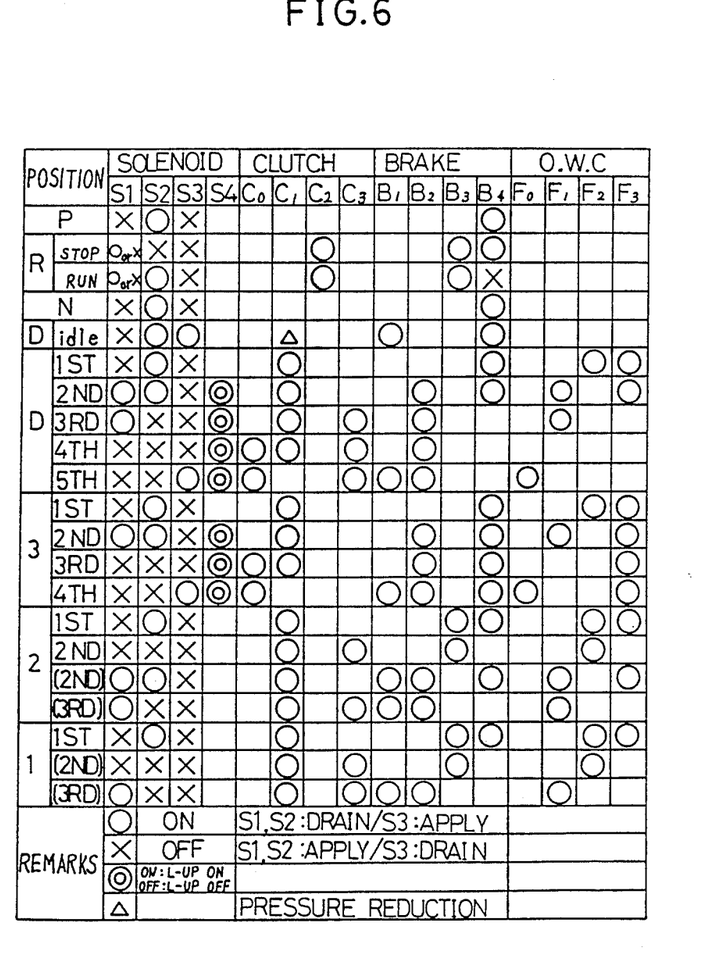
FIG. 6 is a table of operation for said modified embodiment.

An embodiment in which the fourth brake B4 (under drive) is to be released when shifting from N range to R range during running at high speed is described in accordance with FIG. 5 and FIG. 6. A description of elements that correspond to those in the previous embodiment, has been omitted.

In a hydraulic circuit $40_2$, the (3-4) shift valve 12 does not have the port Rc connected to the oil path Ra as in the previous embodiment; rather, the oil path from the port R is directly connected to the third servo B₃ through a check valve 18, and the check valve 18 is connected through the oil path 2m to the port 2l of the (1-2) shift valve 11. The (2-3) shift valve 13 has a port Rf connected to the port R of the manual valve 10, and a port Lf connected to the oil path from port D instead of the oil path Le.

When the manual valve 10 is set at 2 range, as in the previous embodiment, line pressure form the port 2 of the manual valve 10 is applied to the third brake hydraulic servo B₃ through the oil path 2g, the ports 2h, 2i of the (1-2) shift valve 12, the oil path 2j, the ports 2k, 2l of the (1-2) shift valve 11, and the check ball 18.

When the manual valve is set at R range, line pressure from the port R is directly applied to the third brake hydraulic servo B₃ through the check valve 18, and is applied to the second clutch hydraulic servo C₂ through a check valve 17. Then, the four speed automatic transmission mechanism 23 assumes a reverse condition.

When the manual valve is shifted to R range, if a vehicle stops or runs at less than a predetermined speed, the second solenoid S2 is switched "OFF" and the (2-3) shift valve 13 assumes the "upper half position". Line pressure from port R is applied to the fourth brake hydraulic servo B₄ through ports the Rf, Lg. Due to this operation, the reverse rotation of the four speed automatic mechanism 23 is transmitted to the wheels through the underdrive mechanism 25 which is in the underdrive condition; accordingly, the vehicle travels in reverse.

When the manual valve is shifted to R range, if the vehicle runs at speed higher than a predetermined speed, the second solenoid valve S2 is switched "ON" and drained in accordance with the signals from the controller U. The (2-3) shift valve 13 assumes the "lower half position" and line pressure from the port R is disconnected. In addition to the above, the port D of the manual valve 10 is drained, and the fourth brake hydraulic servo B4 is drained through the ports Lg, Lf and port D.

It is impossible to the underdrive mechanism 25 to transmit the drivng force; consequently, the reverse rotation of the four speed automatic transmission 23 is not transmitted to the wheels.

As another embodiment, the application of the present invention to a three speed automatic transmission mechanism will be described with reference to FIGS. 7 and 8.

Figure 7:
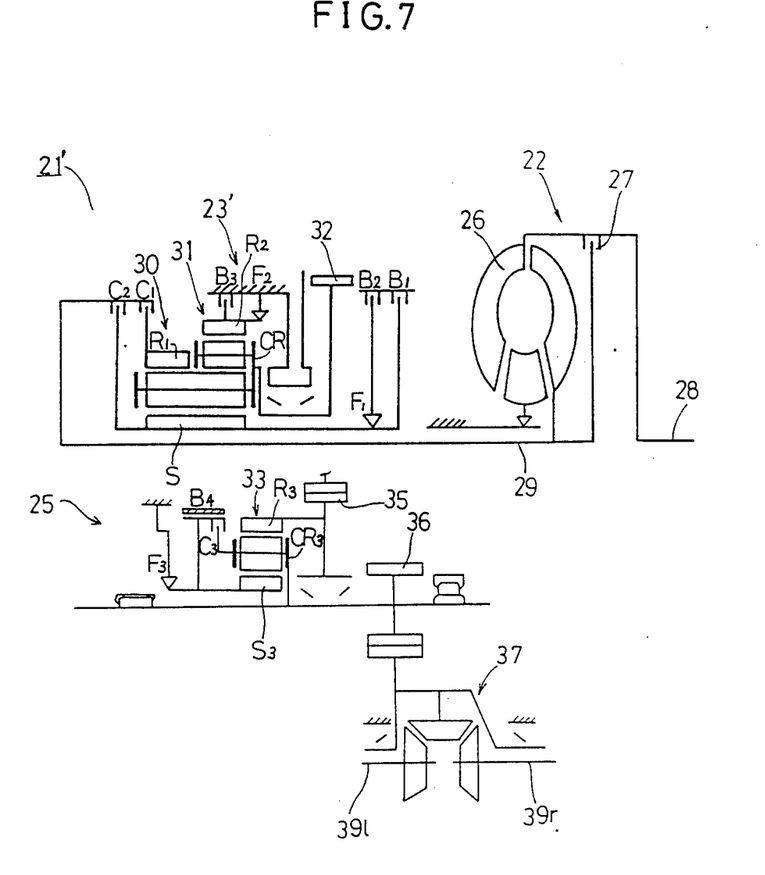
FIG. 7 is a schematic diagram of another automatic transmission to which the present invention is applicable.
Figure 8:
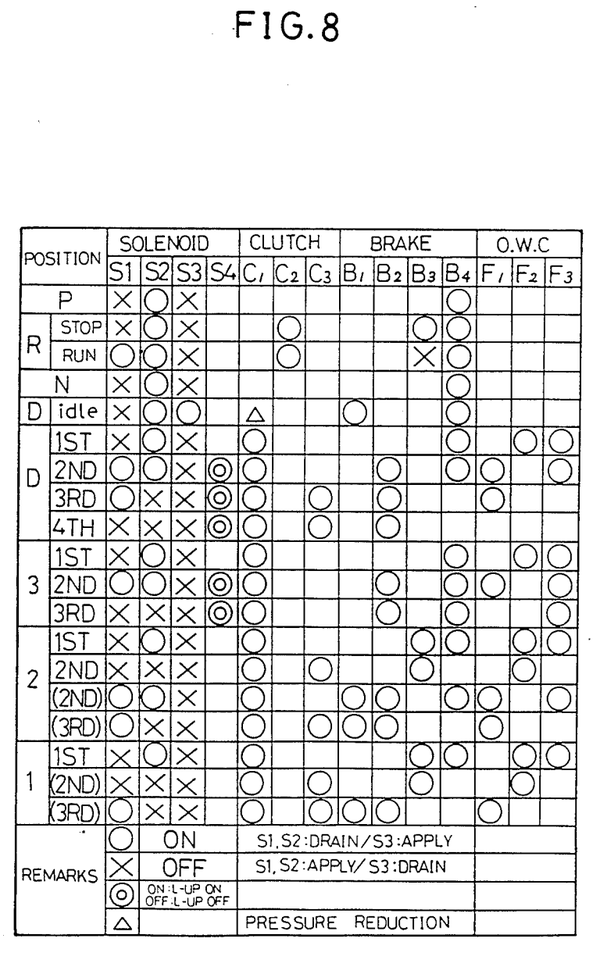
FIG. 8 is a table of operation of the automatic transmission of FIG. 7.

In the three speed automatic transmission mechanism 23', as shown in FIG. 7, the third clutch C₀, the one-way clutch F₀ of the above-described four speed transmission are omitted and the mechanism 23' is coupled with the underdrive mechanism 25 as in the previous embodiment. The system as a whole, therefore, is a four speed automatic transmission 21'. As shown in FIG. 8, the operation of the automatic transmission 21' is similar to the above-described embodiment except that the clutch C₀, the one-way clutch F₀, the 5th speed at D range and the 4th speed at 3 range are omitted.

Figure 9:
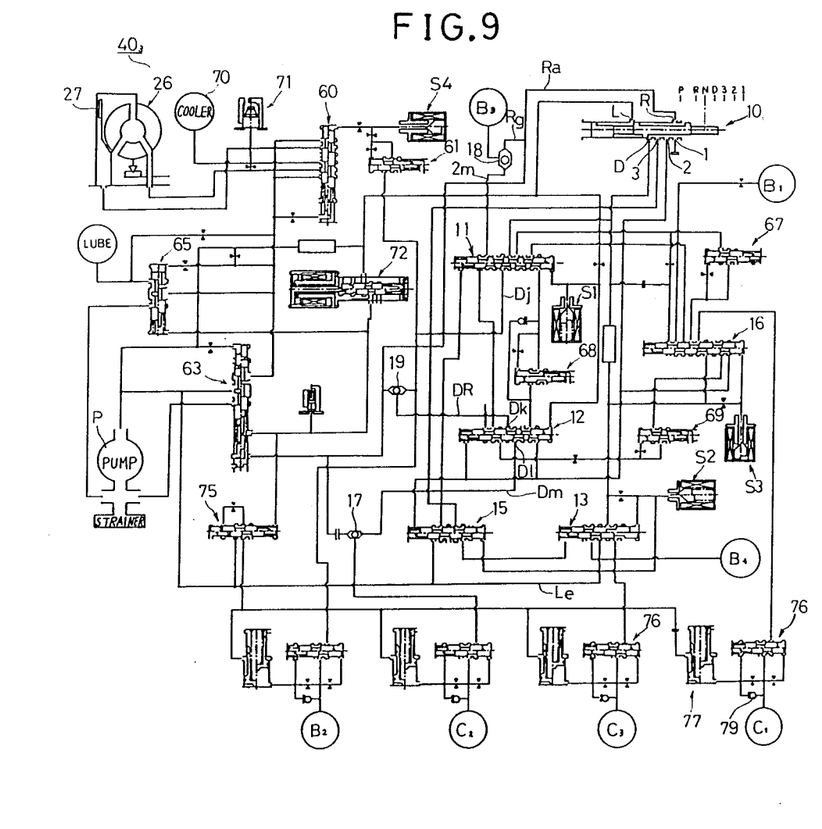
FIGS. 9 and 10 are hydraulic circuits incorporating other embodiments of the present invention.

FIG. 9 shows another embodiment in which the present invention is applied to the automatic transmission 21'. Elements corresponding to those in the previous embodiment have the same reference numerals and the description thereof is omitted. The oil path Ra from the port R of the manual valve 10 is connected to the third brake hydraulic servo B₃ through the branch oil path Rg and the check valve 18, and is connected to the check valve 19. The other inlet portion of the check valve 18 is connected via the oil path 2m to the shift valve 11 and the outlet portion of the check valve 19 is connected to the port Dk of the (3-4) shift valve 12 through the oil path DR.

Accordingly, when the manual valve 10 is shifted to R range, if a vehicle stops or runs a lower than a predetermined speed, the first solenoid valve S1 is switched "OFF" or assumed the "supplied-condition", and the second solenoid valve S2 is switched "ON" or assumes the "drain-condition". The (3-4) shift valve 12 assumes the "upper half position" and the (2-3) shift valve 13 assumes the "lower half position". Line pressure in the oil path Le is applied to the fourth brake hydraulic servo B4. Line pressure in the oil path Ra via the port R is applied to the third brake hydraulic servo B₃ through the oil path Rg, and the check valve 18; also, line pressure in the oil path Ra is applied to the port Dk of the (3-4) shift valve 12 which is in the "upper half position" through the check valve 19 and the oil path Dr, and is applied to the second brake hydraulic servo C₂ through the port Dl of the (3-4) shift valve 12 and the oil path Dm.

Due to the above operation, in the automatic transmission 21', the second clutch C₂, and the third and the fourth brakes B₃, B₄ are engaged and operated and the reverse rotation is obtained.

When shifting to R range, if the vehicle runs at a predetermined high speed, the controller U sends an "ON" signal to the first solenoid valve S1. The solenoid valve S1 is drained, and the (3-4) shift valve 12 is shifted to the "lower half position". Then, the ports Dk and Dl are disconnected, the port Dl is connected to a drain port, and the second clutch hydraulic servo C₂ is drained. Consequently, the automatic transmission 21' is protected from being shifted to the reverse condition.

Figure 10:
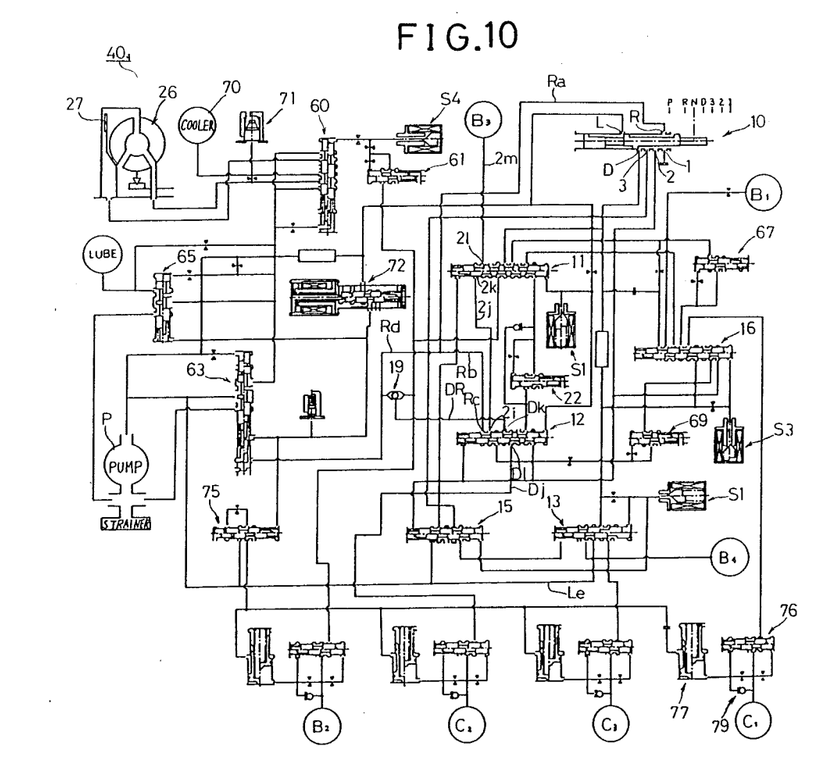

Another embodiment in which the present invention is incorporated in the automatic transmission 21' is shown in FIG. 10. Elements corresponding to those in the previous embodiment are designated with the same reference numerals and the description thereof is omitted.

When the manual valve 10 is shifted to R range, if a vehicle stops or runs at a predetermined slow speed, the first solenoid valve S1 is switched "OFF" so as to assume the "supply-condition", and the second solenoid valve S2 is switched "ON" to assume the "drain condition". The (1-2) shift valve 11 and the (3-4) shift valve 12 assume the "upper half position" and the (2-3) shift valve 13 assumes the "lower half position". Under this condition, line pressure in the oil path Le is applied to the fourth brake hydraulic servo B4, line pressure in the oil path Ra from the port R is applied to the third brake hydraulic servo B3 through the ports Rc, 2i of the (3-4) shift valve 12, the oil path 2j, the ports 2k, 2l of the (1-2) shift valve 11 and the oil path 2m, and is also applied to the second clutch hydraulic servo C₂ through the oil path Rd, the check valve 19, the oil path DR, ports Dk, Dl of the (3-4) shift valve 12, and the oil path Dj. Then, the automatic transmission 21' assumes the reverse condition and the vehicle travels in reverse. On the other hand, when the manual valve 10 is shifted to R range, if the vehicle runs at certain high speed, the first solenoid valve S1 is switched "ON" by the signal from the controller U. The (1-2) shift valve 11 and the (3-4) shift valve 12 are shifted to the "lower half position". Then, the ports Rc, 2i, Dk and Dl of the (3-4) shift valve 12 are disconnected, the port D is connected to the drain port, and the ports 2k and 2l of the (1-2) shift valve 11 are disconnected and the port 2l is connected to the drain port. Accordingly, the second clutch hydraulic servo $C_2$ and the third brake hydraulic servo $B_3$ are drained, and the automatic transmission 21' is protected from assuming the reverse condition.

As is apparent from above, the reverse shift control device of an automatic transmission according to the present invention is applicable to automobiles, trucks, special purpose cars and automobiles in general. The reverse shift control device can also be applied to Simpson type automatic transmissions, Ravigneaux type automatic transmissions and multispeed automatic transmissions coupled with a sub-transmission mechanism, etc.

What is claimed is:

1. In an automatic transmission of a vehicle having a transmission gear mechanism including a plurality of rotatable components and through which transmission gear mechanism power is transmitted in a respective one of power transmitting paths defined therethrough, frictional engaging means operatively connected to the transmission gear mechanism for selecting the power transmitting path through which power is transmitted in the transmission gear mechanism, said frictional engaging means including a third brake, hydraulic servos operatively connected to the frictional engaging means for operating or releasing or for engaging or disengaging the frictional engaging means, a plurality of shift valves operatively hydraulically connected to the hydraulic servos and a source of line pressure and which shift valves are movable between respective positions at which the line pressure is supplied toward the servos and respective positions at which the supply of line pressure is interrupted during forward travelling of the vehicle to provide different speeds which can be output by the transmission while the vehicle is travelling forward, and a manual valve operatively hydraulically connected in the transmission between the source of line pressure and the shift valves and which manual valve is settable to a plurality of ranges including reverse, a reverse shift control device comprising:

a respective one of said shift valves that is movable to respective positions during forward travelling of the vehicle to provide different speeds which can be output by the transmission while the vehicle is travelling forward;

said third brake being operatively connected to one of said components for braking a normal and a reverse rotation of said one of said components when said third brake is operated; said third brake being operated when the vehicle is travelling in reverse;

one of the hydraulic servos to which said one of said shift valves is operatively hydraulically connected, said one of the hydraulic servos operatively connected to said third brake;

said one of said shift valves having a first port in direct open hydraulic communication with said manual valve, line pressure being supplied directly to said first port from said manual valve when said manual valve is set to said reverse range, and said one of said shift valves having a second port in hydraulic communication with said one of the hydraulic servos, line pressure passing from said second port to said one of the hydraulic servos when said third brake operatively connected to said one of the hydraulic servos is to be operated, said one of said shift valves being movable between a first position at which said first and said second ports are open to one another and a second position at which said first and said second ports are closed to one another, solenoid valve means operatively connected to said one of said shift valves for causing said one of said shift valves to move between said positions thereof; and control means operatively connected to said solenoid valve means for controlling said solenoid valve means to cause said one of said shift valves to move to said second position thereof when said manual valve is set to said reverse range while the vehicle is travelling at a speed higher than a predetermined speed.

2. A reverse shift control device of an automatic transmission as claimed in claim 1, wherein a second one of said shift valves is operatively hydraulically connected to said one of the hydraulic servos, line pressure passing through said second one of said shift valves to said one of the hydraulic servos when said third brake is to be operated.

3. A reverse shift control device of an automatic transmission as claimed in claim 1, wherein said transmission gear mechanism includes a plurality of rotatable components, and said frictional engaging means includes a second clutch which is engaged when the vehicle is travelling in reverse, said second clutch operatively connected between two said components of said gear mechanism for transmitting rotation from one of said two components to the other of said two components when said second clutch is engaged.

4. A reverse shift control device of an automatic transmission as claimed in claim 1, wherein said transmission gear mechanism includes an automatic transmission mechanism and one of an underdrive mechanism and an overdrive mechanism, said one of said underdrive and said overdrive mechanisms including a rotatable component, and said third brake is operatively connected to said component for braking or engaging said component.

5. A reverse shift control device of an automatic transmission as claimed in claim 1, wherein the transmission defines an oil path from said manual valve having a plurality of branches open to the source of line pressure through said manual valve when the manual valve is set at said reverse range, said first port being open to one of said branches and said one of said branches being uninterrupted so that said first port is in direct open hydraulic communication with said manual valve through one of said branches, and a check valve being disposed in another of said branches.

* * * * *